United States Patent
Kitamura et al.

(10) Patent No.: US 6,488,407 B1
(45) Date of Patent: Dec. 3, 2002

(54) RADIATION TEMPERATURE MEASURING METHOD AND RADIATION TEMPERATURE MEASURING SYSTEM

(75) Inventors: Masayuki Kitamura, Hachioji (JP); Eisuke Morisaki, Sagamihara (JP); Nobuaki Takahashi, Hachioji (JP); Takashi Shigeoka, Chofu (JP)

(73) Assignee: Tokyo Electron Limited, Tokyo-To (JP)

( * ) Notice: Subject to any disclaimer, the term of this patent is extended or adjusted under 35 U.S.C. 154(b) by 0 days.

(21) Appl. No.: 09/527,243

(22) Filed: Mar. 17, 2000

(30) Foreign Application Priority Data

Mar. 19, 1999 (JP) .......................................... 11-076210

(51) Int. Cl.⁷ .............................. G01J 5/00; G01J 5/08
(52) U.S. Cl. ..................... 374/126; 374/130; 702/130; 392/416; 118/724
(58) Field of Search ............................... 374/126, 130, 374/131, 128, 124; 438/16; 392/416, 418; 219/390, 405, 411; 118/724, 725; 702/130, 134, 159, 172

(56) References Cited

U.S. PATENT DOCUMENTS

| | | | |
|---|---|---|---|
| 5,061,084 A | * 10/1991 | Thompson et al. | 374/127 |
| 5,114,242 A | * 5/1992 | Gat et al. | 374/128 |
| 5,156,461 A | * 10/1992 | Moslehi et al. | 374/121 |
| 5,660,472 A | 8/1997 | Peuse et al. | |
| 5,755,511 A | 5/1998 | Peuse et al. | |
| 5,823,681 A | * 10/1998 | Cabib et al. | 374/126 |
| 5,830,277 A | * 11/1998 | Johnsgard et al. | 118/725 |
| 6,007,241 A | * 12/1999 | Yam et al. | 374/131 |
| 6,056,434 A | * 5/2000 | Champetier | 374/126 |
| 6,174,080 B1 | * 1/2001 | Jennings | 374/131 |
| 6,179,466 B1 | * 1/2001 | Peuse et al. | 374/128 |
| 6,183,130 B1 | * 2/2001 | Adams et al. | 374/131 |
| 6,232,593 B1 | * 5/2001 | Taniguchi et al. | 250/231.13 |

FOREIGN PATENT DOCUMENTS

| | | |
|---|---|---|
| JP | 3-105223 | 5/1991 |
| JP | 8-255800 | 10/1996 |
| JP | 10-98084 | 4/1998 |
| JP | 11-40510 | 2/1999 |

* cited by examiner

*Primary Examiner*—Diego Gutierrez
*Assistant Examiner*—Lydia M. De Jesús
(74) *Attorney, Agent, or Firm*—Smith, Gambrell & Russell, LLP

(57) ABSTRACT

The present invention intends to improve the accuracy of temperature measurement when measuring the temperature of a semiconductor wafer by a radiation thermometer on the basis of the idea of virtual blackbody simulated by multiple reflection of light. A system includes a wafer (W), a circular reflector 1 of a radius R disposed opposite to the wafer (W), and a probe (2) disposed in a through hole formed in the reflector (1). The probe (2) is a through hole. The radiation intensity of radiation passed the through hole is determined by image data provided by a CCD camera disposed behind the back surface of the reflector (1). An error in measured radiation intensity of radiation falling the probe (2) due to light that enters a space between the wafer (W) and the reflector (1) and a space between the reflector (1) and the probe (2) and light leaks from the same spaces is corrected, the emissivity of the wafer (W) is calculated and the temperature of the wafer (W) is determined.

4 Claims, 9 Drawing Sheets

RADIATION TEMPERATURE MEASURING METHOD AND RADIATION TEMPERATURE MEASURING SYSTEM

BACKGROUND OF THE INVENTION

1. Field of the Invention

The present invention relates to a radiation temperature measuring method and a radiation temperature measuring system to be applied to, for example, the temperature of a semiconductor wafer.

2. Description of the Related Art

A single-wafer heating apparatus is one of heating apparatus for heat-treating semiconductor wafers. Such a heating apparatus heats a wafer for an annealing process by heat generated by heating lamps. To anneal a wafer in a high intrasurface uniformity, it is necessary to measure the temperature of the wafer, and to regulate the temperatures of the heating lamps on the basis of measured temperature in a feedforward or feedback control mode. Some methods of measuring the temperature of the wafer use a radiation thermometer.

These methods measure the emissivity of the wafer and determine the temperature of the wafer on the basis of the emissivity and measured intensity of radiation emitted by the wafer. Methods of measuring the emissivity are classified roughly into two methods. In one type of methods, light having a known wavelength and a known intensity is emitted, then reflected light from the surface of the wafer is detected to determine the emissivity. In the other type of methods, radiation emitted by the wafer is subjected to multiple reflection, then reflected radiation is detected in a plurality of environments respectively having different geometric factors, then the emissivity is calculated on the basis of a plurality of data.

A temperature measured by any one of those methods includes a measuring error caused by a loss due to the scattering of the reflected light outside a probe principally owing to scattering on the measuring surface of the wafer, and noise caused by the unnecessary detection of light emitted by the heating lamps. Therefore, the probe must be set very close to the measuring surface of the wafer, i.e., the probe must be set at a position at 0.5 to 5 mm from the measuring surface of the wafer, to suppress the effect of those causes of measuring error. Such a requirement with the probe places significant restrictions on the design of the radiation thermometer and there is the possibility that the probe affects adversely to the uniform heating of the wafer.

U.S. Pat. No. 5,660,472 discloses a correcting technique for measurement employing a virtual blackbody included in a multiple reflection system. Basically, this correcting technique is practiced as follows. As shown in FIG. 13, the measuring system includes, as basic components, a wafer W, a reflecting plate (bottom wall of a vessel) 101, and first and second probes (two sapphire rods) 102. The temperature of the wafer W is measured by the following procedure.

(i) The first probe 102 of a diameter $d_p$ is inserted in a first aperture of a diameter $d_1$ ($d_1 > d_p$) formed in the reflecting plate 101.

(ii) Since the aperture of the finite size exists when virtual blackbody cavity is formed, reflected light is reduced by an amount. Therefore, an effective reflectivity $R_1$ is determined taking into consideration a decrement in reflected light.

(iii) The second probe 102 of a diameter $d_p$ is inserted in a second aperture of a diameter $d_2$ ($d_2 > d_p$) formed beside the first hole.

(iv) An effective reflectivity $R_2$ is determined taking into consideration a decrement in reflectivity.

(v) The reflectivities $R_1$ and $R_2$, measured temperatures $T_1$ and $T_2$ measured respectively by the probes 102 are substituted into a specific equation to calculate the temperature of the wafer.

The foregoing correcting technique has the following problems:

① Basically, the virtual blackbody is composed of a flat plate of an infinite dimensions, however, the characteristics of the virtual blackbody is spoiled by the two apertures formed therein for the probes.

② Normally, the reflectivity of the virtual blackbody is not affected by the emissivity of the wafer. As obvious from the fact that the virtual black body takes the effective reflectivities into consideration, the reflectivity of the reflecting plate 101 is not "1"; that is, the reflectivity of the reflecting plate 101 is affected to the emissivity of the wafer, so that accurate measurement of thermal emissive cannot be achieved.

③ The radiation thermometer cannot measure low temperatures.

SUMMARY OF THE INVENTION

The present invention has been made to solve the foregoing problems and it is therefore an object of the present invention to provide a radiation temperature measuring method capable of measuring the temperature of a measuring object in a high accuracy by using a multiple reflection system.

Another object of the present invention is to provide a radiation temperature measuring system suitable for carrying out the radiation temperature measuring method.

According to a first aspect of the present invention, a radiation temperature measuring method is provided, which determines the temperature of a flat measuring surface of a measuring object on the basis of a measured radiation intensity obtained by using an optical reflector having a flat reflecting surface narrower than the measuring surface and disposed with the reflecting surface thereof facing the measuring surface, and optical path extending through the optical reflector and respectively having an exposed light-receiving plane surrounded by the reflecting surface, and by receiving radiation undergone multiple reflection between the measuring surface and the reflecting surface through the light-receiving plane of the optical path. The method including the following steps:

(a) setting four combinations of measuring conditions ($S_1$, $d_1$), ($S_1$, $d_2$) ($S_2$, $d_1$) and ($S_2$, $d_2$), where $S_1$ and $S_2$ are the areas S of the reflecting surfaces, and $d_1$ and $d_2$ are distances d between the reflecting surfaces and the measuring surface, and measuring radiation intensities $E_{s1d1}$, $E_{s1d2}$, $E_{s2d1}$ and $E_{s2d2}$ for the four combinations;

(b) substituting the areas S, and an area of a side surface of a cylindrical space between the reflecting surface and the measuring surface (a product of perimeter D of the reflecting surface and the distance d) and the measured radiation intensity E into an expression:

$$E = \frac{\varepsilon E_0}{1 - R(1-\varepsilon)} \cdot S + D \cdot d(E_{N1} - E_{L1}) + (E_{N2} - E_{L2})$$

where $\varepsilon$ is an emissivity of the measuring surface, $E_0$ is a blackbody radiation intensity at a temperature T, R is a reflectivity of the reflecting surface, $E_{N1} - E_{L1}$ is a correction for correcting an error due to noise entering and leaking from the cylindrical space between the reflecting surface and the measuring surface, and $E_{N2}-E_{L2}$ is a correction for correcting an error due to noise entering and leaking from the space between the reflector and the optical path, to calculate $E_{N2}-E_{L2}$ for each of the four combinations;

(c) substituting calculated $E_{N2}-E_{L2}$ into the expression, setting two combinations of measuring conditions of the area S and the distance d, the two combinations being different from each other, measuring radiation intensities for the two combinations, and substituting the measured radiation intensities into the expression to determine $E_{N1}-E_{L1}$;

(d) correcting the measured radiation intensity on the basis of the expression into which $E_{N1}-E_{L1}$ and $E_{N2}-E_{L2}$ are substituted;

(e) calculating the emissivity of the measuring surface on the basis of a measured radiation intensity measured with the reflector removed and the corrected measured radiation intensity corrected in step (d); and (f) determining temperature of the measuring surface on the basis of the emissivity of the measuring surface and the measured radiation intensity measured with the reflector removed.

The two combinations used in step (c) may be selected from the combinations in step (a).

According to a second aspect of the present invention, a radiation temperature measuring system for measuring the temperature of a flat measuring surface of a measuring object comprises: a rotating plate disposed opposite to the measuring surface; at least five sets of light-receiving parts P1 to P5 disposed in a circumferential arrangement on the rotating plate and smaller than the measuring surface; at least five optical path forming members disposed in a space between the measuring surface and the rotating plate opposite to the measuring surface so as to correspond to the light-receiving parts P1 to P5; and a radiation intensity measuring unit for measuring the respective intensities of radiation passed the light-receiving parts disposed on the rotating plate.

Each of the light-receiving parts P1 has a through hole, and each of the light-receiving parts P2 to P5 has a reflector having a flat reflecting surface facing the measuring surface and provided with a through hole formed therein in a direction along the thickness of the rotating plate and having one end opening in the reflecting surface. The areas of the reflecting surfaces of the light-receiving parts P2 and P3 are $S_1$ and those of the light-receiving parts P4 and P5 are $S_2$. The distance between the reflecting surface of the light-receiving parts P2 and the measuring surface and the distance between the reflecting surface of the light-receiving part P3 and the measuring surface are $D_1$ and $D_2$, respectively, and the distance between the reflecting surface of the light-receiving parts P4 and the measuring surface and the distance between the reflecting surface of the light-receiving part P5 and the measuring surface are $D_1$ and $D_2$, respectively. The rotating plate is rotated to locate the light-receiving parts P1 to P5 sequentially opposite to the optical path forming members, and the emissivity of the measuring surface is determined on the basis of radiation intensities measured by the radiation intensity measuring unit.

In this radiation temperature measuring system, it is preferable to cover a space through which the radiation leaving the exit ends of the light-receiving parts travels with a black cover. It is preferable that the radiation intensity measuring unit is capable of collectively measuring errors caused by the radiation leaving the light-receiving parts as two-dimensional data.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

The principle of the radiation temperature measuring method of the present invention will be described prior to the explanation of the preferred embodiment of the radiation temperature measuring method.

Ideal Model (Model 1) for Radiation Temperature Measuring Method

Figure 1:
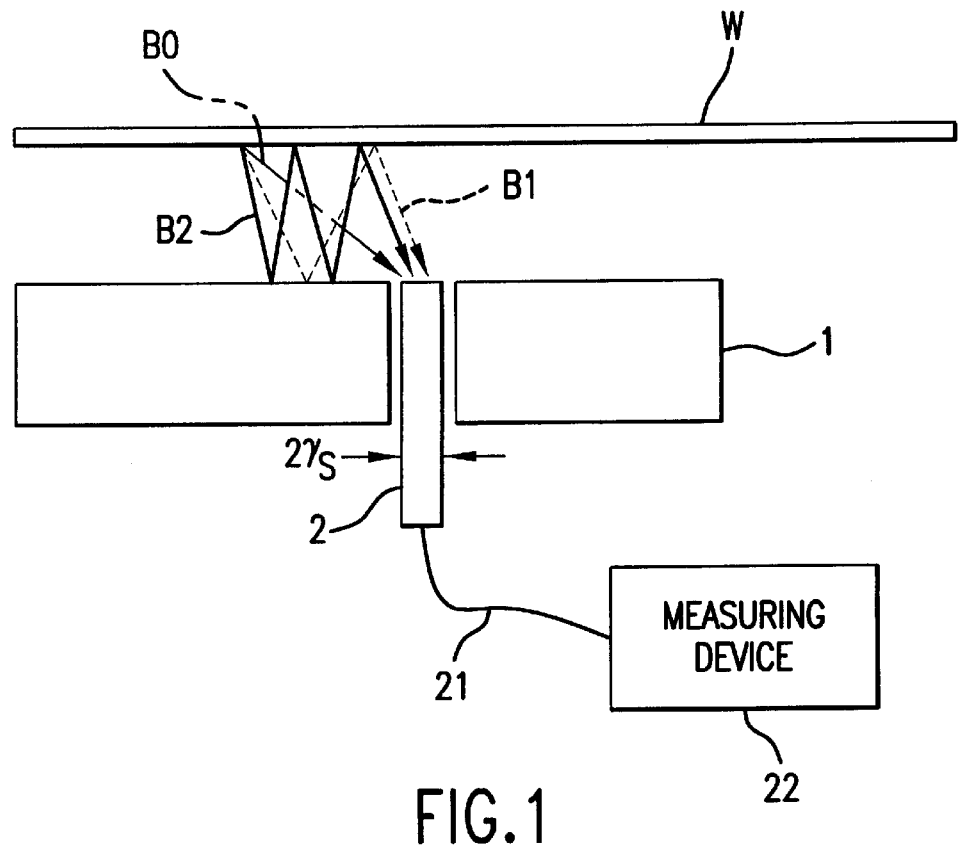
FIG. 1 is a schematic view of an ideal model of a measuring system used for carrying out a radiation temperature measuring method in a preferred embodiment according to the present invention.
Figure 2:
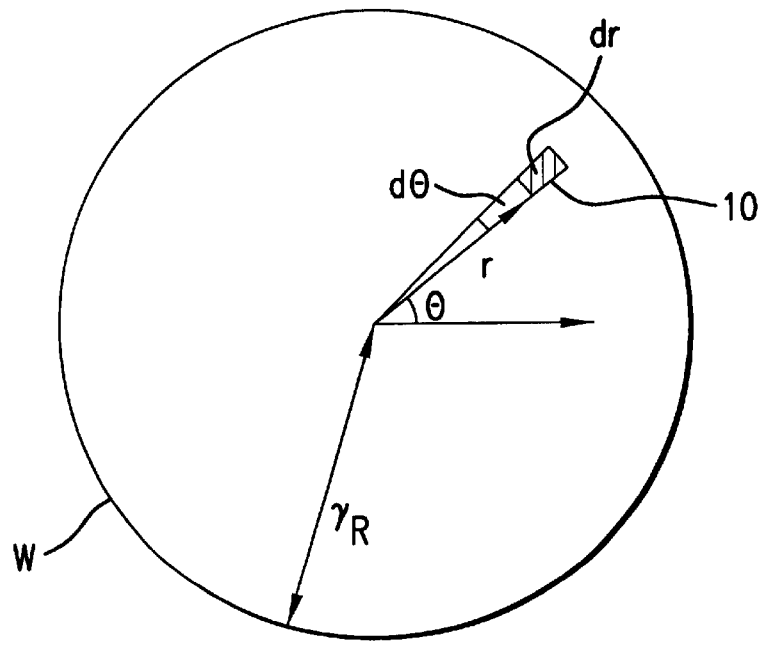
FIG. 2 is plan view of assistance in explaining small regions in a surface of a wafer.

Referring to FIG. 1 showing an ideal model of a measuring system, a wafer W, i.e., a measuring object, is disposed opposite to a reflector 1, and a radiation temperature probe (hereinafter referred to simply as "probe") 2, i.e., an optical path forming member, is inserted in a hole formed in the reflector 1. The size of the wafer W is greater than that of the reflector 1; that is, when viewed from above, the reflector 1 is concealed under the wafer W. The reflector 1 is, for example, a circular mirror. The probe 2 is a rod of quartz or sapphire having a circular cross section of a radius $r_s$. The wafer w has an emissivity $\epsilon$. Blackbody radiation intensity at a temperature T is $E_0$. The reflector 1 has a reflectivity R.

Supposing that light of an intensity $\epsilon E_0$ is radiated from a shaded small region 10, radiation that falls on the probe 2 is the sum of radiation B0 coming from the wafer W directly to the probe 2, radiation B1 reaching the probe 2 after being reflected once by the reflector 1, radiation B2 reaching the probe 2 after being reflected twice by the reflector 1, ..., and radiation $B^\infty$ reaching the probe 2 after being reflected infinite times by the reflector 1. Therefore, the intensity $E_{r\theta}$ of light that falls on the probe 2 is expressed by:

$$E_{r\theta} = \epsilon E_0 + \epsilon E_0 R(1-\epsilon) + \epsilon E_0\{R(1-\epsilon)\}^2 + \epsilon E_0\{R(1-\epsilon)\}^3 + \ldots = \frac{\epsilon E_0}{1-R(1-\epsilon)} \quad (1)$$

$$(R, \epsilon \leq 1)$$

Ultimately, all the radiation reflected by the reflector 1 falls on the probe 2. Therefore, the incident radiation intensity $E_{T1}$ is expressed by:

$$E_{T1} = \int_0^{2\pi} \int_0^r E_{r\theta} \, dr \, d\theta \quad (2)$$

Suppose that a region of the wafer W facing the surface of the reflector 1 is heated at a uniform temperature. Practically, the reflector 1 having a radius in the range of 5 to 10 mm is used for processing 8 in. diameter wafers. Therefore, it may safely be said that a region of the wafer W facing the surface of the reflector 1 is heated at a substantially uniform temperature. Even if the region is not heated at a uniform temperature, a temperature determined by measuring radiation through the probe 2 may be regarded as the mean of temperatures of regions of the wafer W facing the reflector 1 and the measured temperature is satisfactory. Accordingly, the incident radiation intensity $E_{T1}$ can be expressed by:

$$E_{T1} = \frac{\epsilon E_0}{1-R(1-\epsilon)} \pi r_R^2 \quad (3)$$

The incident radiation intensity $E_{T2}$ measured by a similar method with the reflector 1 removed is expressed by:

$$E_{T2} = \epsilon E_0 \pi r_s^2 \quad (4)$$

From Expressions (3) and (4), $$\frac{E_{T1}}{E_{T2}} = \frac{1}{1-R(1-\epsilon)} \cdot \frac{r_R^2}{r_s^2} \quad (5)$$

As shown in FIG. 1, the probe 2 is connected to a measuring device 22 by an optical fiber cable 21. The incident radiation intensities $E_{T1}$ and $E_{T2}$, i.e., the intensities of the radiation falling on the probe 2, can be measured by the measuring device 22, and the emissivity $\epsilon$ of the wafer is determined. Then, the temperature of the wafer W can be easily determined from the radiation intensity measured by the measuring device 22.

Practical Model (Model 2) for Radiation Temperature Measuring Method

The foregoing ideal model represents the basic idea for the measurement of emissivity using multiple reflection and temperature correction. Practically, the wafer W and the reflector 1 are spaced a finite distance apart and therefore it must be noted that:

(a) radiation emitted by the lamp serving as a heat source, or a heater of a heating apparatus enters a space between the wafer W and the reflector 1; and (b) radiation leaks from the space.

In the previously described ideal model, the matters mentioned in (a) and (b) are factors that cause errors and hence it is difficult to achieve accurate measurement. The distance between the wafer W and the reflector 1 must be reduced to an infinitesimal to reduce the error. The reduction of the distance between the wafer W and the reflector 1 affects adversely the uniform heating of the wafer W. Therefore, errors caused by the factors (a) and (b) are corrected by the following method.

Figure 3:
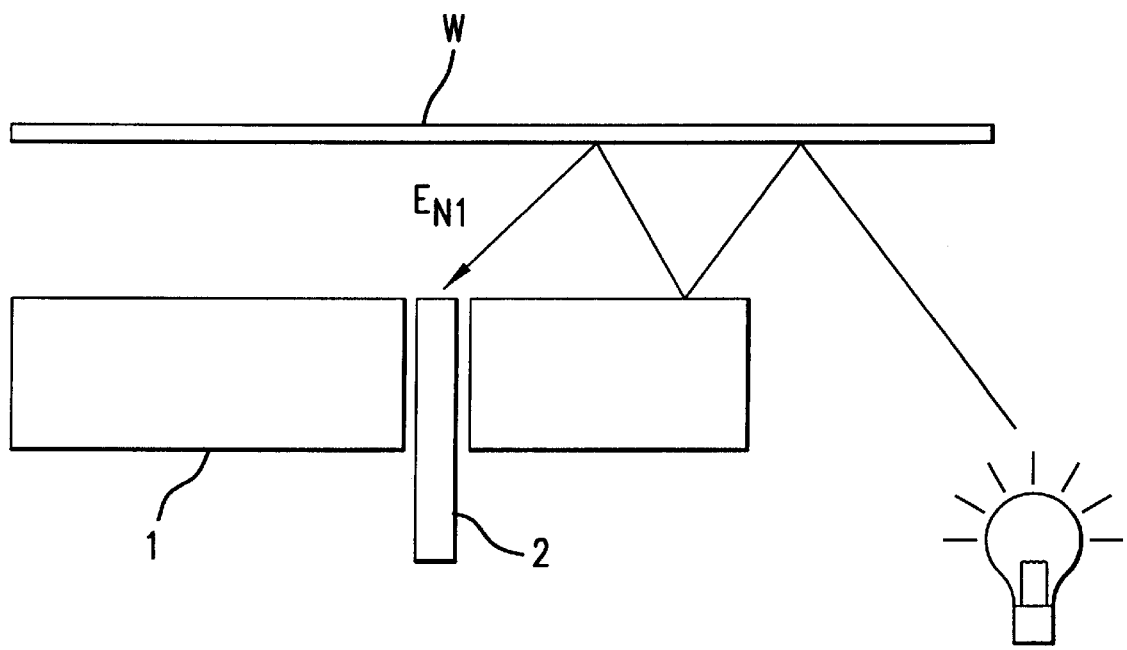
FIG. 3 is a schematic view of a first practical model of a measuring system used for carrying out the radiation temperature measuring method according to the present invention.
Figure 4:
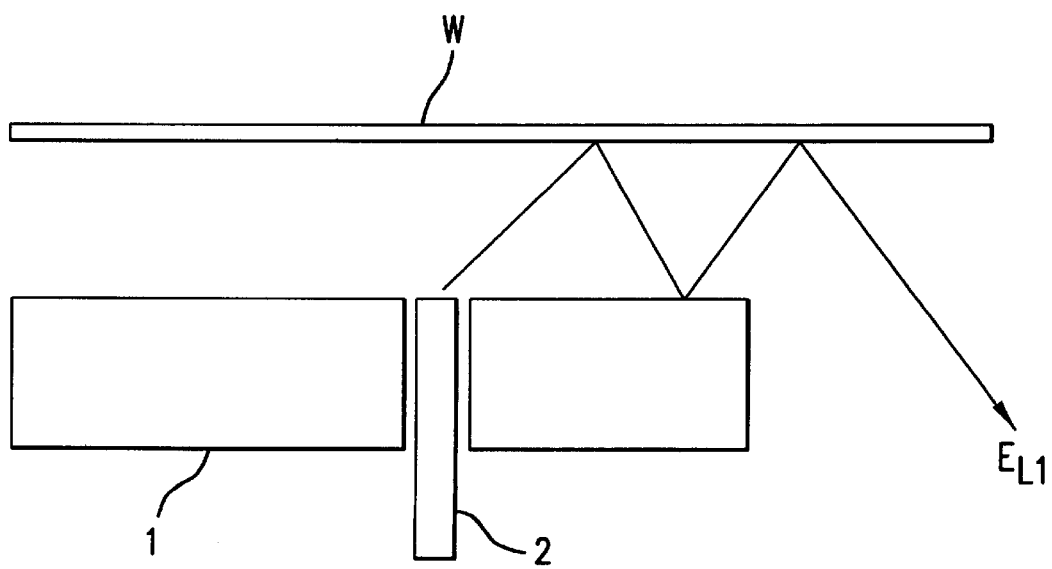
FIG. 4 is a schematic view of a second practical model of a measuring system used for carrying out the radiation temperature measuring method according to the present invention.
Figure 5:
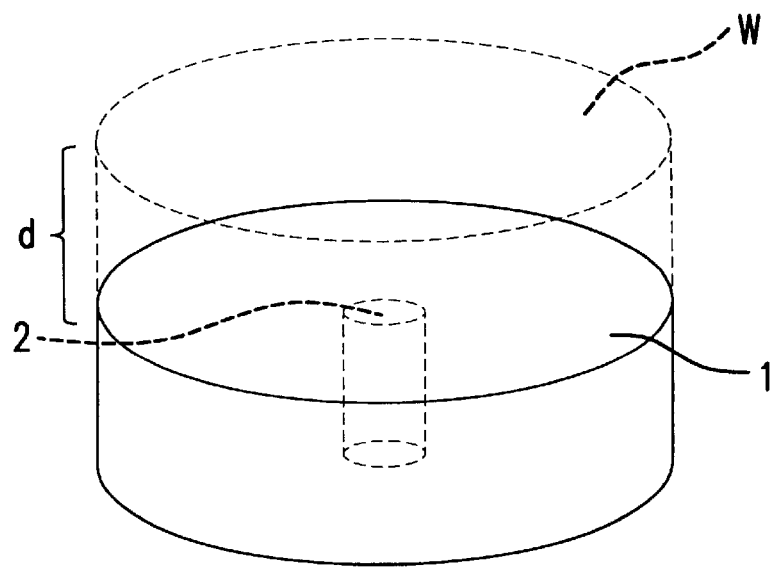
FIG. 5 is a perspective view of a model representing a space between a wafer and a reflector in the practical model of a measuring system

Suppose that light of an intensity $E_{N1}$ enters a space between a wafer W and a reflector 1 and light of an intensity $E_{L1}$ leaks from the space as shown in FIGS. 3 and 4. A circumferential surface, which is an extension of the circumference of the reflector 1, may be regarded as an entrance/exit of the space between the wafer W and the reflector 1. Therefore, radiation intensity $E_{T1d1}$ corresponding to the radiation intensity $E_{T1}$ expressed by Expression (3) is expressed by:

$$E_{T1d1} = \frac{\epsilon E_0}{1-R(1-\epsilon)} \pi r_R^2 + 2\pi r_R d_1(E_{N1} - E_{L1}) \quad (6)$$

$E_{T1d2}$ corresponding to $E_{T1}$ expressed by Expression (3) is expressed by:

$$E_{T1d2} = \frac{\epsilon E_0}{1-R(1-\epsilon)} \pi r_R^2 + 2\pi r_R d_2(E_{N1} - E_{L1}) \quad (7)$$

where $d_2$ is the distance between the wafer W and the reflector 1.

Subtracting Expression (7) from Expression (6) we obtain:

$$E_{N1} - E_{L1} = \frac{E_{T1d1} - E_{T1d2}}{2\pi r_R(d_1 - d_2)} \quad (8)$$

Practical Model (Model 3) for Radiation Temperature Measuring Method

Figure 6:
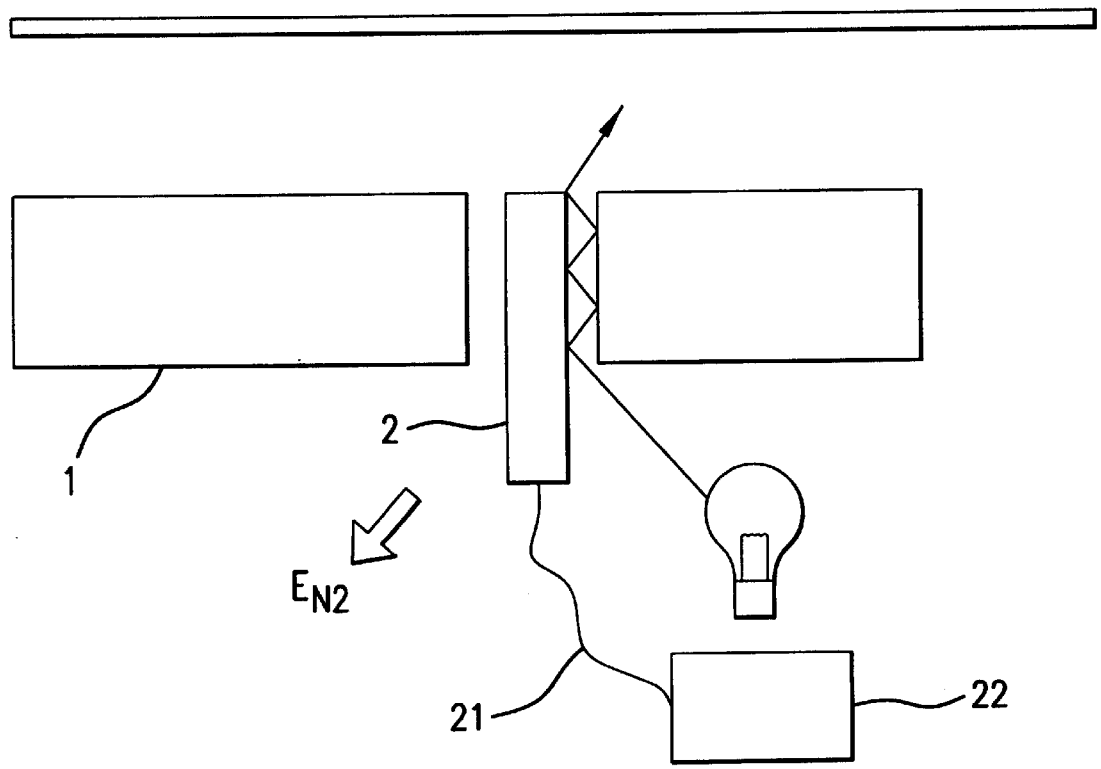
FIG. 6 is a schematic view of a third practical model of a measuring system used for carrying out the radiation temperature measuring method according to the present invention.
Figure 7:
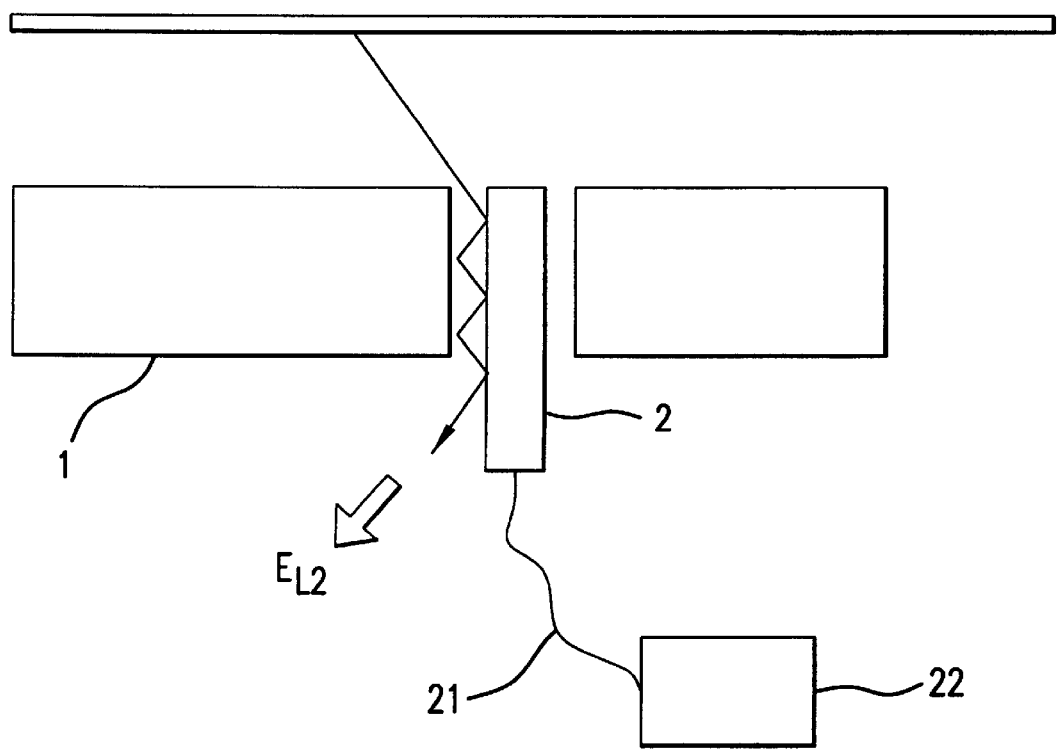
FIG. 7 is a schematic view of a fourth practical model of a measuring system used for carrying out the radiation temperature measuring method according to the present invention.

Practically, light enters the probe 2 through a gap between the reflector 1 and the probe 2 or light falls directly on the side surface of the probe 2 in the foregoing model as shown in FIGS. 6 and 7 to generate noise. Noise generated by light thus entering the probe will be represented by $E_{N2}$. A light loss is caused by the leakage of light through the gap between the reflector 1 and the probe 2, absorption of light by the probe 2, and absorption of light by the optical fiber cable 21 connecting the probe 2 to the measuring device 22. The light loss will be represented by $E_{L2}$. Taking $E_{N2}$ and $E_{L2}$ into consideration, Expression (7) can be rewritten as:

$$E_{r1d1} = \frac{\varepsilon E_0}{1-R(1-\varepsilon)}\pi r_1^2 + 2\pi r_1 d_1(E_{N1}-E_{L1}) + (E_{N2}-E_{L2}) \quad (9)$$

A method of determining a term $E_{N2}-E_{L2}$ of Expression (9) will be described. Suppose that measured radiation intensities measured by the measuring device 22 are $E_{r1d1}$ and $E_{r1d2}$ when the reflector 1 has a radius $r_1$ and the distance d between the wafer W and the reflector 1 is $d_1$ and $d_2$, respectively. Then, $$E_{r1d1} = \frac{\varepsilon E_0}{1-R(1-\varepsilon)}\pi r_1^2 + 2\pi r_1 d_1(E_{N1}-E_{L1}) + (E_{N2}-E_{L2}) \quad (10)$$

$$E_{r1d2} = \frac{\varepsilon E_0}{1-R(1-\varepsilon)}\pi r_1^2 + 2\pi r_1 d_2(E_{N1}-E_{L1}) + (E_{N2}-E_{L2}) \quad (11)$$

Figure 8:
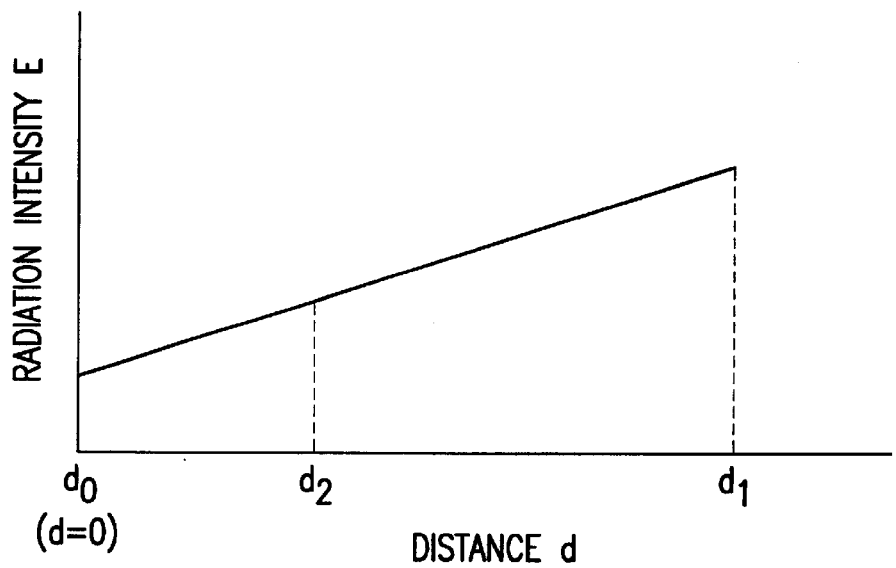
FIG. 8 is a graph of assistance in explaining a method of determining a radiation intensity when the distance d between the wafer and the reflector of the foregoing different practical model is a naught.

FIG. 8 shows the variation of $E_{r1d1}$ and $E_{r1d2}$ measured by the measuring device 22 with the distance d. An incident radiation intensity $E_{r1d0}$ for d=0 estimated by extrapolation from the graph shown in FIG. 8 is equal to an incident radiation intensity when radiation does not leak at all through an end of the reflector 1. Therefore, $$E_{r1d0} = \frac{\varepsilon E_0}{1-R(1-\varepsilon)}\pi r_1^2 + (E_{N2}-E_{L2}) \quad (12)$$

Then, the reflector 1 is replaced with a reflector 1 having a radius $r_2$ and radiation intensities $E_{r2d1}$ and $E_{r2d2}$ respectively for the distance $d=d_1$ and $d=d_2$ are measured by the measuring device 22. A radiation intensity $E_{r2d0}$ estimated by interpolation for d=0 is expressed by:

$$E_{r2d0} = \frac{\varepsilon E_0}{1-R(1-\varepsilon)}\pi r_2^2 + (E_{N2}-E_{L2}) \quad (13)$$

From Expressions (12) and (13), $$E_{N2}-E_{L2} = \frac{r_2^2 E_{r1d0} - r_1^2 E_{r2d0}}{r_2^2 - r_1^2} \quad (14)$$

Highly accurate temperature measurement can be achieved by determining the values $E_{N2}-E_{L2}$ and $E_{N1}-E_{L1}$ and, finally, determining $\varepsilon$ by sequentially using the foregoing expressions from the last one toward the first one. The concrete flow of radiation temperature measuring process will be described with reference to a flow chart shown in FIG. 9.

In step S1, the reflector 1 of the radius $r_1$ is disposed at a distance $d_1$ from the wafer W and radiation intensity $E_{41d1}$ is measured by the measuring device 22.

In step S2, the distance $d_1$ between the reflector 1 and the wafer W is changed for a distance $d_2$ and radiation intensity $E_{r1d2}$ is measured. In step S3, the reflector 1 of the radius $r_2$ is disposed at the distance $d_1$ from the wafer W and radiation intensity $E_{r2d1}$ is measured. In step S4, the reflector of the radius $r_2$ is disposed at the distance $d_2$ from the wafer W and radiation intensity $E_{r2d2}$ is measured.

In step S5, the measured radiation intensities obtained in steps S1 to S4 are subjected to calculations as explained in connection with the description of the second practical model to calculate $E_{N2}-E_{L2}$.

Then, the calculated $E_{N2}-E_{L2}$, and $E_{r1d1}$ and $E_{r1d2}$ measured in steps S1 and S2 are substituted into Expressions (10) and (11) to calculate $E_{N1}-E_{L1}$ in step S6.

In step S7, measured data obtained in, for example, step S1 is corrected by using calculated data calculated in steps S5 and S6. A radiation intensity is determined by subtracting $\{2\pi \cdot r_1 \cdot d_1(E_{N1}-E_{L1})+(E_{N2}-E_{L2})\}$ from the measured data. This corrected radiation intensity is the radiation intensity $E_{T1}$ expressed by Expression (3) mentioned in the description of the ideal model. Then, the reflector 1 is removed and radiation intensity is measured in step S8. This radiation intensity corresponds to the radiation intensity $E_{T2}$ expressed by Expression (4) mentioned in the description of the ideal model. The radiation intensities $E_{T1}$ and $E_{T2}$ obtained in steps S7 and S8 are substituted into Expression (5) to calculate the emissivity $\varepsilon$ of the wafer W. In Expression (5), $r_R=r_1$.

After thus determining the emissivity $\varepsilon$ of the wafer W, the probe 2 is disposed opposite to the wafer W with the reflector 1 removed, and radiation intensity $E_T$, i.e., radiation intensity when the wafer W is heated at a temperature T, is measured. Then, the temperature T of the wafer W can be determined by calculation using Expression (15)

$ET=\varepsilon \cdot E_{BB}(T)$, ($E_{BB}(T)$ is blackbody radiation intensity at the temperature T)

$$E_{BB}(T) = \frac{C_1 \lambda^{-5}}{\exp\frac{C_2}{\lambda T} - 1} \quad (15)$$

where $\lambda$ measuring wavelength, T is absolute temperature, and $C_1$ and $C_2$ are constants.

The reflector 1 and the probe 2 need not necessarily be circular. For example, $\pi r_R^2$ in the foregoing expressions is changed for the area of the reflector 1 (including a region in which the probe 2 is disposed), and $2\pi r_R$ is changed for the perimeter of the reflector 1 when the reflector 1 and the probe 2 are not circular.

When calculating $E_{N1}-E_{L1}$, the measured data obtained in Steps S1 and S3 may be used instead of the measured data obtained in steps S1 and S2; that is, data obtained by using a different set of the distance between the reflector 1 and the wafer W, and the area of the reflector 1 can be used.

Figure 10:
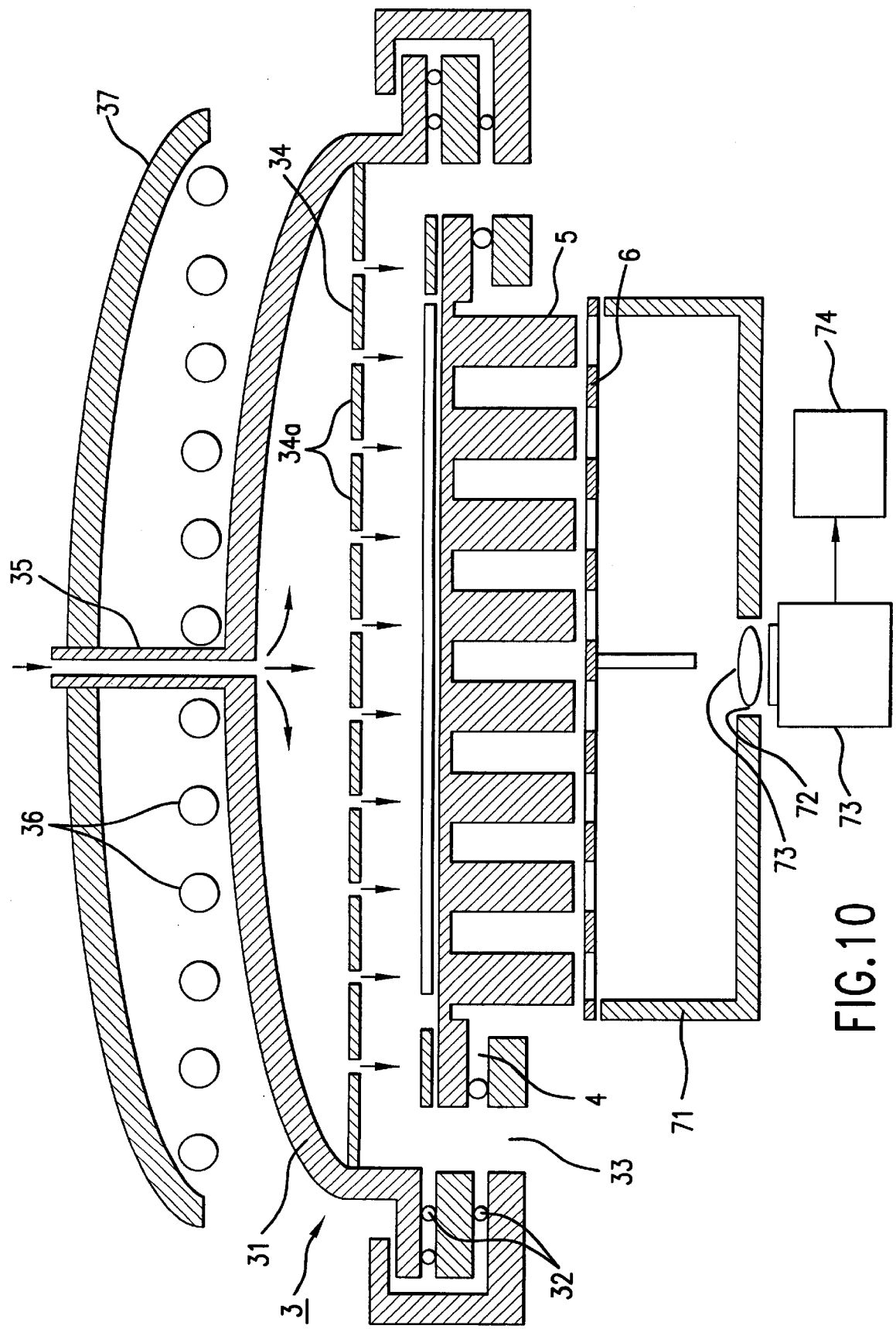
FIG. 10 is a schematic longitudinal sectional view of a radiation temperature measuring system in a preferred embodiment according to the present invention.

A radiation temperature measuring system for carrying out the radiation temperature measuring method according to the present invention will be described with reference to FIGS. 10 to 12. FIG. 10 shows a radiation temperature measuring system in a preferred embodiment according to the present invention incorporated into a single-wafer heating apparatus in a schematic sectional view. A processing vessel 3 is constructed by assembling a plurality of members including a dome-shaped top member 31 made of quartz with sealing members 32, such as O rings, interposed between the joints of the members. A table 4 for supporting a wafer W thereon serves as the bottom wall of the processing vessel 3. Discharge passages 33 are formed in peripheral parts of the table 4.

A shower plate 34 provided with a plurality of gas supply holes 34a is disposed opposite to the table 4 in an upper region of a processing chamber defined by the processing vessel 3. A gas supply pipe 35 is connected to a central part of the dome-shaped top member 31. A process gas supplied thought the gas supply pipe 35 flows through the gas supply holes 34a into the processing chamber. Heating lamps 36, i.e., heat sources, such as halogen lamps, are arranged above the processing vessel 3. A reflecting member 37, such as a mirror, is disposed above the heating lamps 36. Since the single-wafer heating apparatus is well-known, the same is shown in a typical view in FIG. 10. Actually, the processing vessel 3 is provided in its side wall with an opening through which a wafer is carried into and carried out of the processing chamber, and lifting members are disposed around the support table 4 to lift up a wafer W and to transfer the same to an external wafer carrying arm.

The table 4 is made of, for example, quartz and is provided with twenty cylindrical quartz rods 5 of the same size projecting downward from positions on the lower surface thereof corresponding to light-receiving parts P1 to P5 formed in a rotating plate 6, which will be described later. Each of the rods 5 serves as an optical path forming member. The rotating plate 6 is disposed directly under the rods 5. The rotating plate 6 is supported for rotation in a horizontal plane. As shown in FIG. 11, the rotating plate 6 is supported and is guided for rotation by, for example, five guide rollers 60 disposed in contact with the circumference of the rotating plate 6. One or two of the five guide rollers 60 are driven by a driving means to drive the rotating plate 6 for rotation.

The four first light-receiving parts P1, the four second light-receiving parts P2, the four third light-receiving parts P3, the four fourth light-receiving parts P4 and the four fifth light-receiving parts P5 are arranged along radial lines, respectively. The first light-receiving parts P1 are round through holes 61. The second, third and fourth light-receiving parts P2, P3 and P4 are through holes formed in the central parts of circular reflectors (mirrors) 62. The through hole 61 serving as the first light-receiving part P1 creates a state corresponding to the state of the model previously described in connection with the radiation temperature measuring method where the reflector 1 is removed and only the probe 2 is used. In the first light-receiving part P1, the prove 2 corresponds to an imaginary hole formed in a central region of the through hole 61. Therefore, the first light-receiving part P1 corresponds to a unit not provided any reflector 1 around the probe 2. Each of the light-receiving parts P2 to P5 corresponds to a unit provided with the probe 2 extending through the central part f the reflector 1 in the previously described model. The reflector 62 corresponds to the reflector 1 and the through hole 63 corresponds to the probe 2.

The rotating plate 6 is provided with the sixteen light-receiving parts P2 to P5 forming sixteen units each corresponding to the previously mentioned unit having the reflector 1 and the probe 2 disposed in the central part of the reflector 1, and the four light-receiving parts P1 forming four units each having only the probe 2. The through hole 61 serving as the probe 2 has a radius $r_s$, the reflector 62 has a radius R and the distance between the back surface of the wafer W and the reflector 62 is D.

TABLE 1

|  | P1 | P2 | P3 | P4 | P5 |
| --- | --- | --- | --- | --- | --- |
| Radius R | — | $R_1$ | $R_1$ | $R_2$ | $R_2$ |
| Distance D | $D_1$ | $D_1$ | $D_2$ | $D_1$ | $D_2$ |

Figure 11:
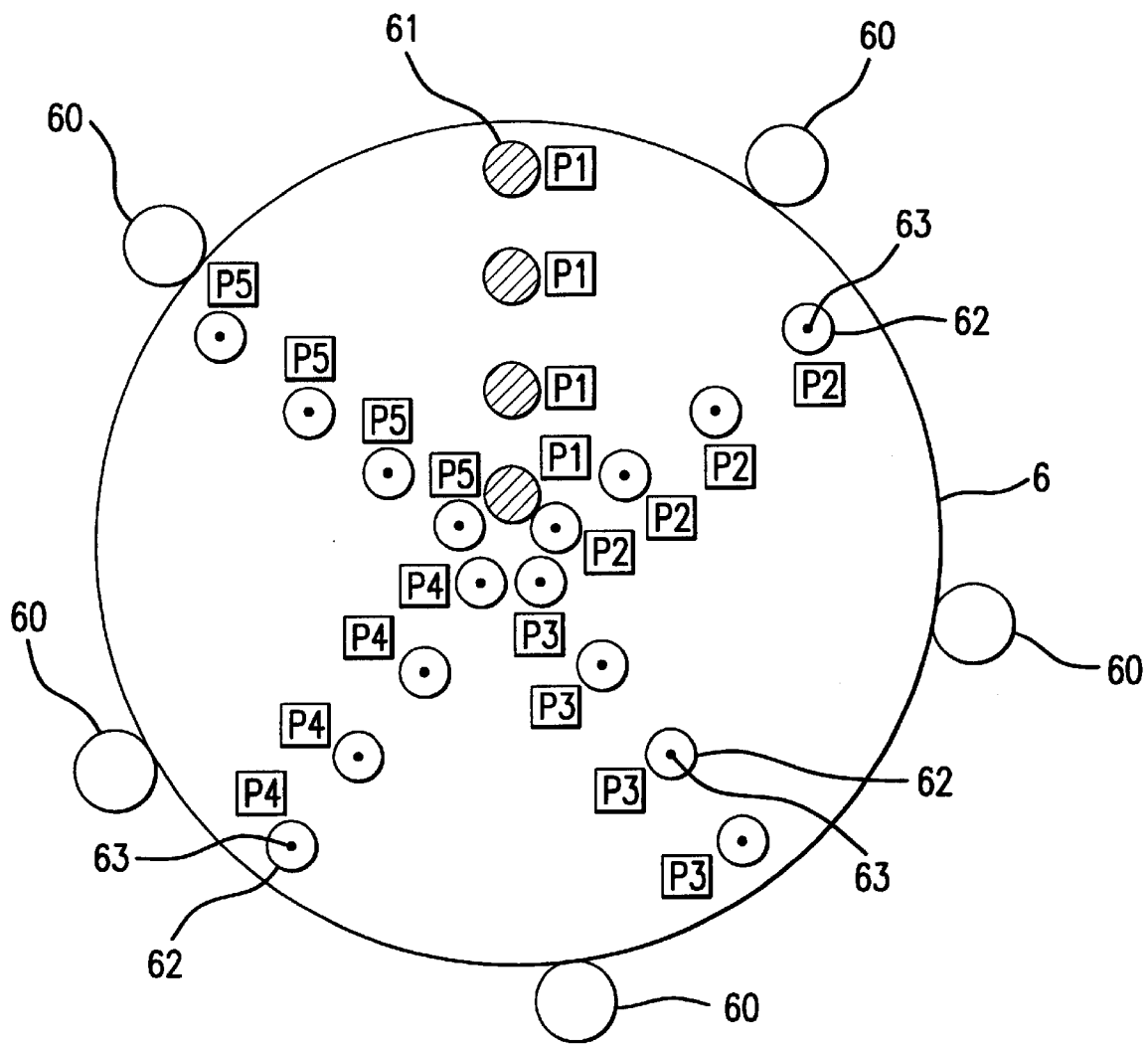
FIG. 11 is a plan view of a rotating plate included in the radiation temperature measuring system shown in FIG. 10.
Figure 12:
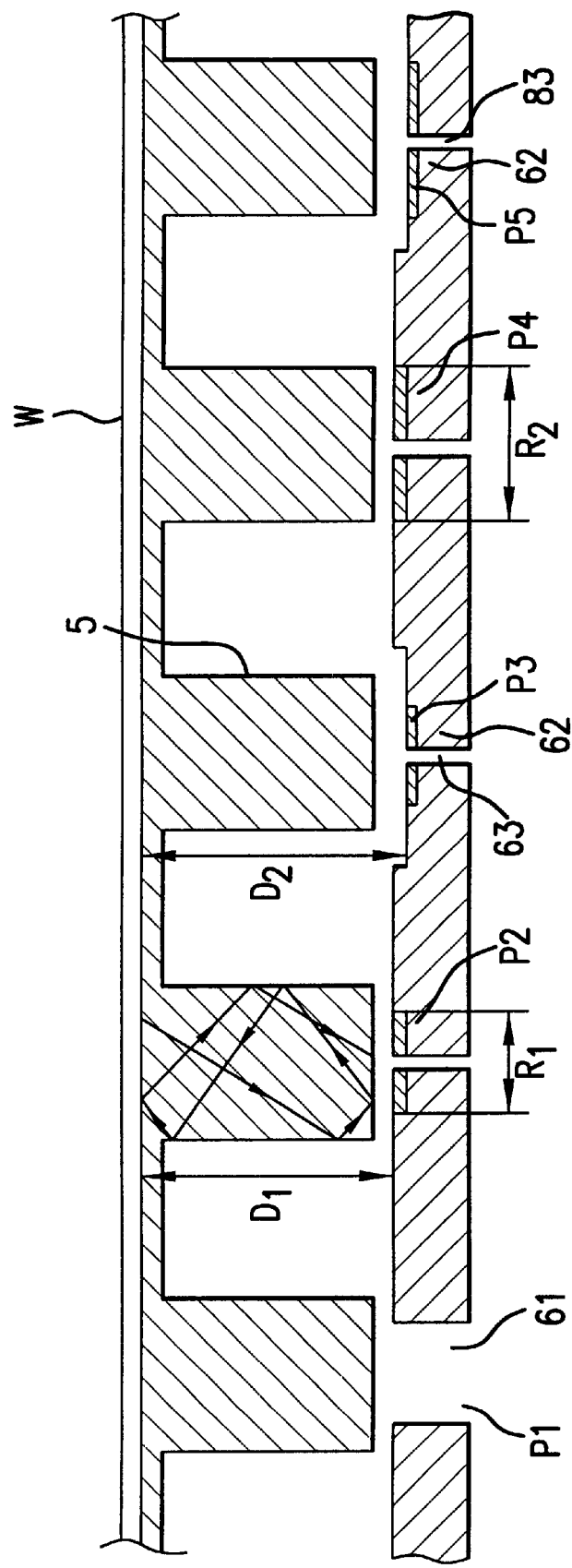
FIG. 12 is a sectional view showing the positional relation between a wafer, rods and a rotating plate.
Figure 13:
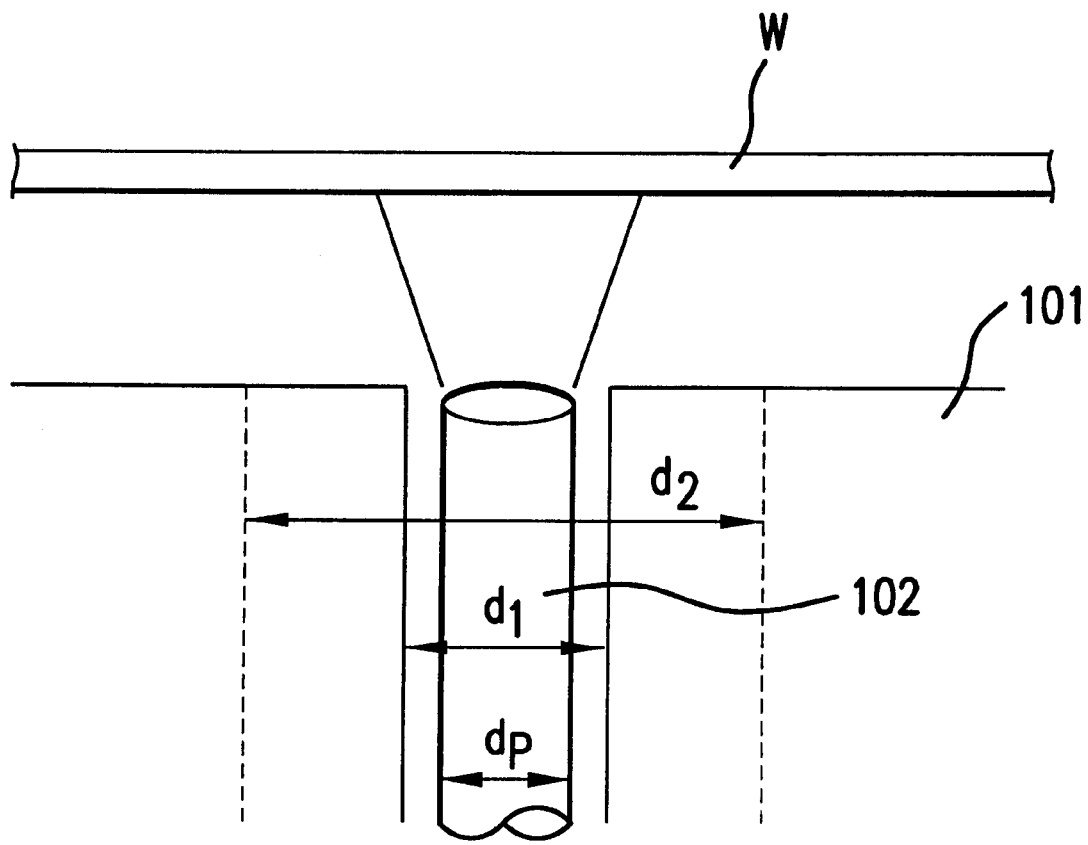
FIG. 13 is a diagrammatic view of assistance in measuring the measuring principle of a conventional radiation temperature measuring system.

FIG. 11 shows the construction of the light-receiving parts P1 to P5, the support table 4 and the wafer W.

Concretely, the radius of the through holes 63 is in the range of 1 to 5 mm, $R_1$ and $R_2$ are in the range of 10 to 20 mm, and $D_1$ and $D_2$ are in the range of 1 to 10 mm. A space under the rotating plate 6 is covered with a cover 71. At least the inside surface of the cover 71 is finished in black to avoid reflecting light and the cover 71 is cooled by a cooling medium. In FIG. 10, a gap is formed between a peripheral part of the rotating plate 6 and the upper edge of the cover 71. Actually, a labyrinth structure is formed in the gap to prevent the leakage of external light into the cover 71. The cover 71 is provided in its bottom wall with an opening 70, and a lens 72 is disposed in the opening 70. A CCD camera 73 provided with an image pickup device is disposed below the lens 72. All the light traveled through the through holes of the rotating plate 6 is converged on the CCD camera by the lens 72. A data processing unit 74 processes image data provided by the CCD camera 73 to determined the measured radiation intensities of the radiation passed through the light-receiving parts P1 to P5, and executes the foregoing arithmetic operations. The CCD camera 73 and the data processing unit 74 constitute a measuring device.

A method of measuring the temperature of a wafer by using the radiation temperature measuring system will be described hereinafter. Nitrogen gas is supplied through the gas supply pipe 35 and the shower plate 34 into the processing chamber after placing a wafer W on the support table 4 disposed in the processing vessel 3, the gas is discharged through the discharge passages 33, and the wafer W is heated at, for example, about 1000° C. by radiant heat emitted by the heating lamps 36 for annealing.

Figure 9:
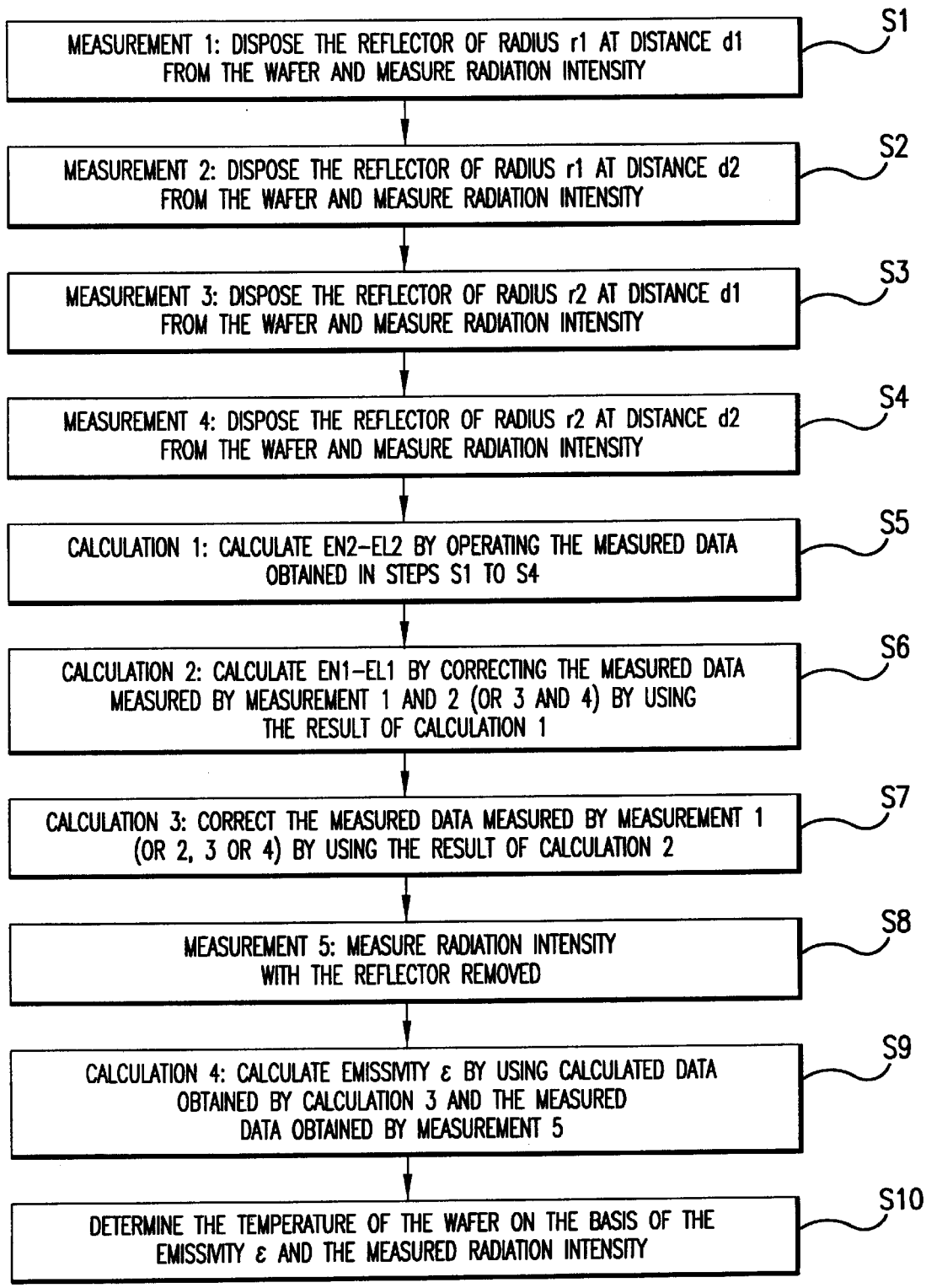
FIG. 9 is a flow chart of the radiation temperature measuring method embodying the present invention.

The rotating plate 6 is set so that the rods 5 projecting downward from the support table 4 correspond to the light-receiving parts P1 to P5, respectively. Thus, the twenty light-receiving parts P1 to P5 are disposed so as to correspond to the twenty rods 5, respectively. Now, we will direct our attention to the radially outermost one of the four first light-receiving parts P1. Radiation emitted from the back surface of the wafer W undergoes multiple reflection in the corresponding rod 5, leaves the rod 5 through the lower end surface of the same and enters the through hole 61. The CCD camera 73 senses radiation leaving the through holes 61 and 63 of the rotating plate 6 to form an image, and the image is processed by the data processing unit 74. Thus, the radiation intensities of the radiation traveled through the twenty light-receiving parts P1 to P5 are measured collectively. Therefore, the radiation intensity of the radiation traveled through the rod 5 and passed the particular light-receiving part P1 also is measured. The radiation passed the particular first light-receiving part P1 corresponds to the radiation received by the probe 2 of the foregoing model from which the reflector 1 is removed. Therefore, this radiation intensity corresponds to $E_{T2}$ expressed by Expression (4); that is, the operation in step S8 shown in FIG. 9 is executed.

Subsequently, the rotating plate 6 is turned counterclockwise as viewed in FIG. 11, to dispose the particular rod 5 sequentially at positions respectively corresponding to the light-receiving parts P2, P3, P4 and P5. Similarly, the radiation intensities of the radiation passed the through holes 63 of the light-receiving parts P2, P3, P4 and P5 are calculated by the data processing unit 74. The radii R of the reflectors 62 of the light-receiving parts P2 to P5 and the distances D between the reflectors 62 and the wafer W are tabulated in Table 1. Therefore, the measurement of the radiation intensities of the radiation is equivalent to the execution of steps S1 to S4 shown in FIG. 9.

The radiation that passed the one particular rod 5 has been described above. The rotating plate 6 is turned one full turn to locate the light-receiving parts P1 to P5 sequentially opposite to the rods 5 to execute the foregoing steps S1 to S4 and S8 for each of the twenty rods 5, and corrected emissivities $\epsilon$ of twenty regions of the wafer W opposite to the rods 5 are calculated, and the temperature of the wafer W is determined on the basis of the corrected emissivities $\epsilon$ (Expression (14)). A thermoviewer, in which a photoelectric device is surrounded by liquid nitrogen for cooling at, for example, −200° C., may be used instead of the CCD camera.

The radiation temperature measuring methods in the foregoing embodiment makes radiation emitted by the wafer undergo multiple reflection, detects the radiation in a plurality of different environments, calculates the emissivity of the wafer on the basis of the radiation intensity of the detected radiation and determines the temperature of the wafer, and measures the radiation from the back surface of the wafer. Even if radiation from the surface of the wafer is measured, the measured temperature is not affected by thickness of a film formed on the surface of the wafer. Since an error due to the leakage of the radiation and noise is corrected automatically, highly accurate measurement can be achieved under various environmental conditions. Since the rods 5 are formed integrally with the support table 4, the radiation temperature measuring system is simple in construction and multiple-point measurement can be achieved at a low cost, and the rotating plate 6 enables quick sampling. Measurement at multiple measuring points, such as several tens measuring points, can be achieved at a low cost through two-dimensional measurement using the CCD camera. Since the high-intensity radiation undergone multiple reflection is detected, temperatures in a low temperature range can be accurately measured.

What is claimed is:

1. A radiation temperature measuring method that determines a temperature of a flat measuring surface of a measuring object on the basis of a measured radiation intensity obtained by using an optical reflector having a flat reflecting surface narrower than the measuring surface and disposed with the reflecting surface thereof facing the measuring surface, and an optical path extended through the optical reflector formed by a plurality of optical path forming members and having an exposed light-receiving plane surrounded by the reflecting surface, and by receiving radiation having undergone multiple reflection between the measuring surface and the reflecting surface through the light-receiving plane of the optical path forming members, said radiation temperature measuring method comprising the steps of:

a) setting four combinations of measuring conditions ($S_1$, $d_1$), ($S_2$, $d_2$), ($S_1$, $d_2$), and ($S_2$, $d_2$), where $S_1$ and $S_2$ are the areas S of the reflecting surfaces, and $d_1$ and $d_2$ are the distances d between the reflecting surfaces and the measuring surface, and measuring $E_{S1d1}$, $E_{S2d1}$, $E_{S1d2}$, and $E_{S2d2}$, which are the radiation intensities E for the four combinations;

b) for each of the combinations of measuring conditions, substituting the corresponding area S of said combination, and an area of a side surface of a cylindrical space between the reflecting surface and the measuring surface, said area being a product of the perimeter D of the reflecting surface and the corresponding distance d of said combination, and the measured radiation intensity E for said combination into an expression:

$$E=(\epsilon E_0 \div (1-R(1-\epsilon)))\times S+D\times d\times (E_{N1}-E_{L1})+(E_{N2}-E_{L2}),$$

where $\epsilon$ is an emissivity of the measuring surface, $E_0$ is a blackbody radiation intensity at a temperature T, R is a reflectivity of the reflecting of the reflecting surface, ($E_{N1}-E_{L1}$) is a correction for correcting an error due to noise entering and leaking from the cylindrical space between the reflecting surface and the measuring surface, and ($E_{N2}-E_{L2}$) is a correction for correcting an error due to noise entering an leaking from the space between the reflector and the optical path, to calculate ($E_{N2}-E_{L2}$) for each of the four combinations;

c) substituting calculated ($E_{N2}-E_{L2}$) and any two of the radiation intensities $E_{S1d1}$, $E_{S2d1}$, $E_{S1d2}$, and $E_{S2d2}$ obtained in the step (a) into the expression, thereby determining $E_{N1}-E_{L1}$;

d) correcting the measured radiation intensity on the basis of the expression into which ($E_{N1}-E_{L1}$) and ($E_{N2}-E_{L2}$) are substituted;

e) calculating the emissivity of the measuring surface on the basis of a measured radiation intensity measured with the reflector removed and the corrected measured radiation intensity corrected in step d); and f) determining the temperature of the measuring surface on the basis of the emissivity of the measuring surface and the measured radiation intensity measured with the reflector removed.

2. A radiation temperature measuring system for measuring temperature of a flat measuring surface of a measuring object, said radiation temperature measuring system comprising:

a rotating plate disposed opposite to the measuring surface;

at least five light-receiving parts P1 to P5 arranged in a circumferential arrangement on the rotating plate, each of the light-receiving parts P1 to P5 having an area smaller than that of the measuring surface;

at least five optical path forming members disposed in a space between the measuring surface and the rotating plate so as to correspond to the light-receiving parts P1 to P5; and a radiation intensity measuring unit that measures intensities of radiations having been passed through the light-receiving parts P1 to P5, respectively; wherein the light-receiving part P1 is a through hole extending in a direction along a thickness of the rotating plate, each of the light-receiving parts P2 to P5 has a reflector having a flat reflecting surface facing the measuring surface, and provided with a through hole extending in a direction along the thickness of the rotating plate and having one end opening in the reflecting surface, the light-receiving part P1 is located at a first distance (d1) apart from the measuring surface, the light-receive part P2 is located at the first distance (d1) apart from the measuring surface, and the reflecting surface of the light-receiving part P2 has a first area (S1), the light-receiving part P3 is located at a second distance (d2) apart from the measuring surface, and the reflecting surface of the light-receiving part P3 has the first area (S1), the light-receiving part P4 is located at the first distance (d1) apart from the measuring surface, and the reflecting surface of the light-receiving part P4 has a second area (S2), the light-receiving part P5 is located at the second distance (d2) apart from the measuring surface, and the reflecting surface of the light-receiving part P5 has the second area (S2), the rotating plate is rotated to locate the light-receiving parts P1 to P5 sequentially opposite to the optical path forming members, emissivity of the measuring surface is determined on the basis of radiation intensities measured by the radiation intensity measuring unit, and temperature of the measuring surface is determined on the basis of the emissivity and the radiation intensities.

3. The radiation temperature measuring system according to claim 2, wherein a space through which radiation leaving exit ends of the light-receiving parts travels is covered with a black cover, and the radiation intensity measuring unit is capable of collectively measuring errors caused by the radiation leaving the light receiving parts as two-dimensional data.

4. The system according to claim 2, wherein:

said system is provided with a plurality of groups of light-receiving parts, each of the groups including the light-receiving parts P1 to P5 as defined in claim 3;

the light-receiving parts P1 are aligned in a row in a radial direction of the rotating plate;

the light-receiving parts P2 are aligned in a row in a radial direction of the rotating plate;

the light-receiving parts P3 are aligned in a row in a radial direction of the rotating plate;

the light-receiving parts P4 are aligned in a row in a radial direction of the rotating plate;

the light-receiving parts P5 are aligned in a row in a radial direction of the rotating plate, and said system is provided with a plurality of groups of optical path forming members, each of the groups including said five optical path forming members as defined in claim 3.

* * * * *